Jan. 17, 1939.  M. J. SCHLITTERS ET AL  2,143,925
LOCKING DEVICE
Filed April 21, 1936
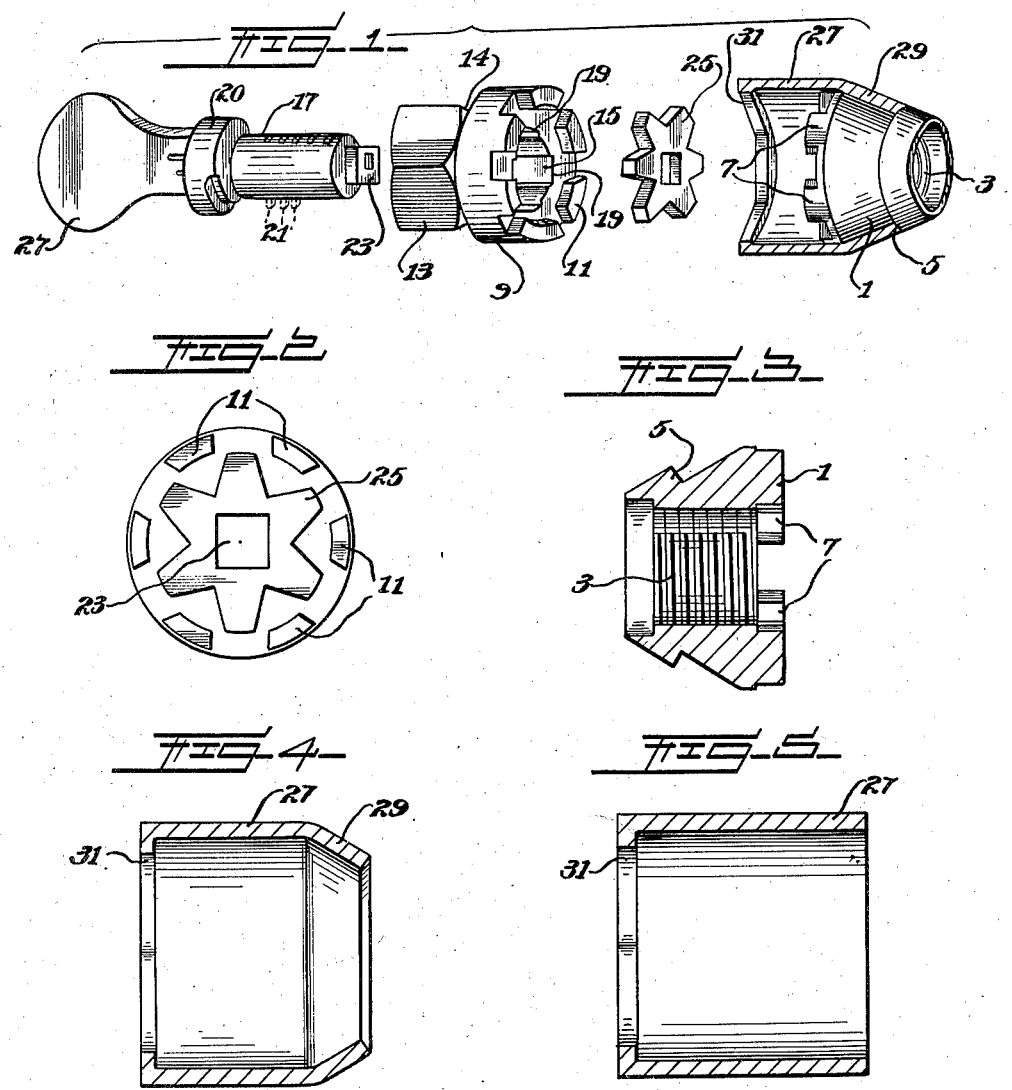
INVENTOR
Michael J. Schlitters.
Mathew Schlitters.
BY
Ralph A. Binns
ATTORNEY Patented Jan. 17, 1939

2,143,925

UNITED STATES PATENT OFFICE 2,143,925

LOCKING DEVICE

Michael J. Schlitters and Mathew Schlitters, Detroit, Mich.

Application April 21, 1936, Serial No. 75,558

2 Claims. (Cl. 70—231)

Our invention pertains to key controlled lock nuts and studs for securely locking assembled parts and apparatus together and more particularly to a lock for locking wheels on vehicles and in general for locking a threaded nut upon a bolt or shaft so that it can only be removed by authorized persons having a key that properly fits the lock.

It is an object of our invention to provide a threaded nut or stud comprising a freely rotatable head or tool receiving portion thereon comprising key controlled means whereby the nut or stud may be turned firmly to its seating position only by an authorized person having a proper key by which he may thereafter adjust the key controlled means so that the head rotates freely and an unauthorized person is unable to remove the threaded nut or stud.

Another object of our invention is to provide a key controlled locking device of the above type wherein interlocking teeth are circularly spaced about adjacent ends of the threaded fastening member and the tool receiving head, which also carries a star wheel mounted on the inner end of the rotatable lock plug comprising radially spaced members equal in number to the circularly spaced teeth and rotatable in the plane of the teeth on the head for controlling the operative interlocking with the teeth on the threaded fastening member.

The invention itself, however, both as to its construction and its method of operation, together with additional objects thereof will best be understood from the following description of specific embodiments, when read in conjunction with the accompanying drawing, where like reference characters are applied to similar elements throughout, and in which:

Fig. 1 is an exploded perspective view showing one embodiment of our key controlled lock nut;

Fig. 2 is an elevational view of the inner end of the tool receiving head showing the operative relation of the star wheel therein in accordance with the embodiment of our invention shown in Fig. 1;

Fig. 3 is a sectional view taken axially through the threaded nut utilized in the embodiment of our invention;

Fig. 4 is a sectional view taken axially through the sleeve which rotatably joins the threaded nut and the tool receiving head;

Fig. 5 is a sectional view showing how the nut joining sleeve is constructed for assembling the device.

Referring more particularly to Fig. 1 of the drawing, our invention comprises a threaded fastening member or nut 1 having an internally threaded aperture 3 extending axially therethrough. The outer surface of the threaded nut 1 is preferably of frusto conical conformation and adjacent its smaller end is provided with the flange receiving groove 5 which extends circumferentially around its outer surface. On its inner end, the threaded nut 1 is provided with interlocking teeth 7 which are spaced circularly adjacent the outer edge thereof.

For applying a tool for turning the threaded nut, we provide a separate auxiliary nut or tool receiving head 9 having on its inner end circularly spaced teeth 11 which are adapted to fit in between and interlock with the teeth 7 circularly spaced on the adjacent end of the threaded nut 1. Although we have shown six interlocking teeth, the particular number thereof is immaterial. On the outer surface of the tool receiving head 9 at the outer end thereof, we provide a tool or wrench receiving portion 13 and a circumferential flange receiving groove 14 adjacent thereto. The tool receiving head is provided with an aperture 15 extending axially therethrough for receiving a lock plug 17 rotatably disposed therein and a smooth counterbore 18 for receiving a retaining ring 20 in the outer end thereof. As shown, the inner side walls of the aperture 15 are provided with circumferentially spaced cut-away portions, or axial channels, 19 to receive the tumblers 21 when these are projected from the lock plug 17, whereby the lock plug may be locked in various rotatable positions in the aperture.

The inner end of the lock plug 17 is provided with a shank 23 for supporting a star wheel 25, which may be secured rigidly thereon by a key or in any suitable manner as by making the shank 23 of square cross-section, as shown. When the lock plug 17 is inserted into the aperture 15, the star wheel 25 is mounted and secured upon the square shank 23 whereby it is supported on the inner end of the lock plug 17 for rotation in the plane of the circularly spaced teeth 11 on the inner end of the tool receiving head. The star wheel has radially projecting members equal in number to the spaced teeth 11 and of a suitable radial dimension to rotate adjacent the insides of the teeth 11 and in the same plane. The teeth 11 on the head are thinner radially than are the teeth 7 on the threaded nut whereby the outer terminals of the star wheel arms are adapted to abut the teeth 7 when the head 9 is moved toward the nut. The tumbler receiving channels 19 in the aperture are so spaced circumferentially that, in locked positions, the radially extending arms of the star wheel are so spaced intermediate the teeth 11 that interlocking engagement of the teeth 11 with the teeth 7 on the threaded nut is prevented.

When a properly fitting key 27 is inserted in the lock plug 17, the tumblers 21 are retracted and the cylindrical lock plug rotates freely in the aperture 15. When the key 27 is removed from the lock plug 17, the tumblers 21 are projected to extended positions, as indicated by the dotted lines, in a well-known manner. Under this condition the rotatable lock plug 17 is rigidly locked with the tumblers 21 extending into one of the channels 19 in the side walls of the aperture and the star wheel 25 is then in such a position that the interlocking teeth 11 of the tool receiving head can not be moved into mesh between the teeth 7 of the threaded nut because the latter are thicker radially and their innermost ends will abut the ends of the arms of the star wheel.

For assembling the locking device, we provide a tubular sleeve 27 having inturned flanges at opposite ends whereby the nuts are joined for relatively free rotation and slight axial movement. For this purpose, the sleeve 27 is provided with a restricted tapered portion 29 which fits snugly over the conical side walls of the threaded nut and seats in the flange receiving groove 5 thereon. At the other end of the sleeve, we provide an inturned flange 31 defining a hexagonal orifice on the end of the sleeve through which the wrench receiving nut 13 may be passed. After the wrench receiving portion 13 of the tool receiving head is extended outwardly through the hexagonal orifice flange 31 of a cylindrical sleeve 27, as shown in Fig. 5, the conical shaped threaded nut is inserted through the other open end of the sleeve and the adjacent side walls of the sleeve are spun down to provide the tapered flange conformation 29 snugly fitting over the threaded nut and engaging in the circumferential groove 5 thereon, as shown in Figs. 1 and 4.

It will be seen that we have provided a key controlled lock nut and stud of a reliable simplified construction which is convenient to assemble and use for locking on the parts of a machine to prevent the theft of vehicle wheels and the like.

Aside from the specific embodiment of the invention herein shown and described, it will be understood that numerous details of the construction may be altered or omitted without departing from the spirit and scope of the invention, as disclosed and claimed herein, and that we do not desire to limit the invention to the exact construction herein set forth.

We claim:

1. A key controlled lock nut having in combination, an internally threaded nut, a tool receiving head, a tubular sleeve joining said nut and said head for relatively free rotation, interlocking teeth spaced circularly on adjacent ends of said nut and said head, an aperture in said head, a key controlled lock plug disposed in said aperture for rotation to various locked positions therein, a star wheel actuated by the rotation of said lock plug for controlling the interlocking engagement of said spaced teeth whereby only authorized persons can turn the threaded nut by applying a tool on said tool receiving head.

2. A key controlled lock nut having in combination, an internally threaded nut, a head, a tubular sleeve joining said nut and said head for relatively free rotation, sets of interlocking teeth spaced circularly on adjacent ends of said nut and said head, a tool receiving portion on said head, an aperture in said head, a key controlled lock plug disposed in said aperture for rotation to various locked or unlocked positions therein, a star wheel rotatably actuated by said lock plug comprising members extending radially for rotation in the plane of the circularly spaced teeth on the inner end of said head, said radially spaced members being so disposed that they may be aligned radially with the respective ones of the interlocking teeth on the head in the locked positions of said lock plug to allow interlocking engagement between said sets of teeth when the lock plug is unlocked whereby an authorized person may by inserting and turning a proper key move the tool receiving head to interlock its teeth with the teeth on the threaded nut for turning the same, or by removing the key may lock the radially spaced members in positions intermediate the teeth on the head for holding them spaced from the interlocking teeth on said nut to restrict unauthorized removal thereof.

MATHEW SCHLITTERS.
MICHAEL J. SCHLITTERS.